July 10, 1951
J. MOFENSON
2,560,124
INTERVAL MEASURING SYSTEM
Filed March 31, 1950
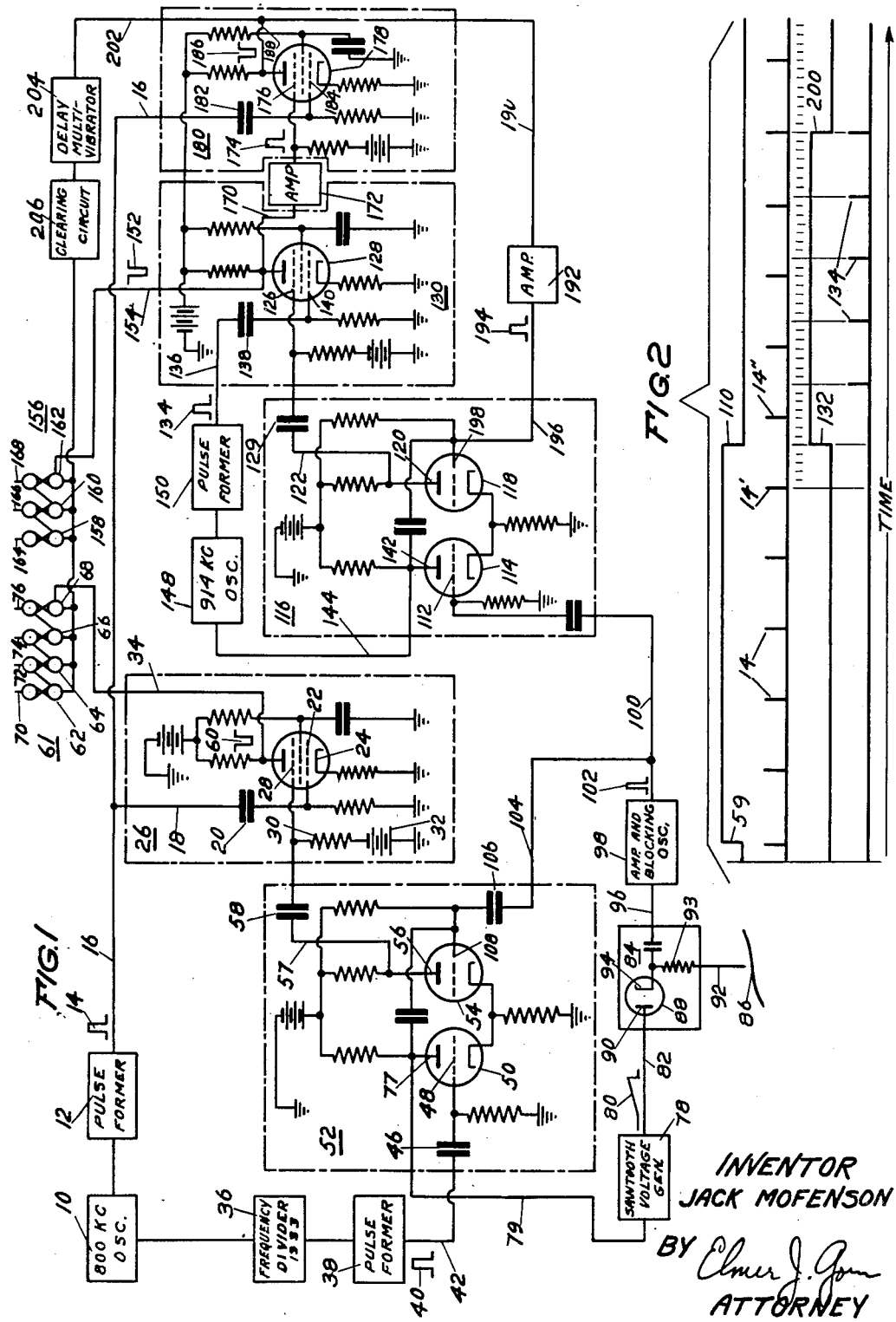
INVENTOR
JACK MOFENSON
BY Elmer J. Gorn
ATTORNEY Patented July 10, 1951

2,560,124

UNITED STATES PATENT OFFICE 2,560,124

INTERVAL MEASURING SYSTEM

Jack Mofenson, Medford, Mass., assignor to Raytheon Manufacturing Company, Newton, Mass., a corporation of Delaware Application March 31, 1950, Serial No. 153,096

9 Claims. (Cl. 332—11)

This invention relates to vernier time interval measurements.

One way of measuring time intervals is to use a fixed frequency oscillator as a master timer and count fixed frequency signals initiated by the master timer and occurring during the time interval to be measured. The accuracy of measurement of a time interval measured in this manner is, in general, determined by the rate of fixed frequency signals being counted. For example, assuming the interval to be measured is 20 microseconds in length, and starts at a point coincident with a fixed frequency signal which is occurring at a rate of 800 kilocycles, only sixteen signals will occur in this 20 microsecond interval. Counters counting these signals will register a count of sixteen in a 20 microsecond interval. But in an interval of slightly under 20 microseconds, only fifteen signals would be registered. Thus, this shorter time interval measurement would have approximately a 7% error. On the other hand, by increasing the counting signal rate, for example, to 6.4 megacycles, there would be 128 signals occurring in the 20 microsecond interval. At this higher frequency the accuracy of measurement of such an interval would be in error by less than .8%.

However, the increase in counting signal rate as above presents other difficulties. One difficulty is that conventional counters, as multivibrator counters, cannot be used for counting such a high signal rate since conventional counting circuits have generally a practical counting rate limitation between 4 and 6 megacycles. Also equipment such as is used in connection with the lower rate signals is highly developed and readily available commercially.

Pursuant to the present invention, a vernier arrangement is used to achieve the approved accuracy of interval measurement without increasing the counting signal rate. In the above instance, for example, the equivalent accuracy of the 128 counting signals in the 20 microsecond interval may be obtained with the use of an 800 kilocycle counting signal rate rather than the much higher 6.4 megacycle rate. Conventional counting circuits may thereby be used in the above instance and in many other applications where frequencies for obtaining the accuracy desired in interval measurement would otherwise be too high.

In this vernier arrangement, a second fixed frequency oscillator is used to produce vernier signals at a rate different from the above-mentioned counting signals. The rate of vernier signals is preferably such that the number of signals occurring in a convenient time interval is one less or one more than the number of counting signals occurring in the same interval. At the point of termination of the time interval to be measured, the vernier signals are led to a second set of counting circuits. The second set of counting circuits counts the vernier signals occurring in the interval between the termination point of the original interval to be measured and the point at which a vernier signal coincides with a counting signal. The length of this second interval is determined by the time interval between the last counting signal registered in the counters and the point of termination of the time interval to be measured. For example, if an 800 kilocycle counting frequency is used and a 914 kilocycle vernier frequency is used, the vernier frequency will effect an accuracy equivalent to dividing the interval between each signal of the counting signals into eight equal time segments. Thus if a time interval to be measured includes the intervals between fifteen counting signals and 5/8 of the interval to a sixteenth counting signal, it will be found that the first set of counters will register a count of fifteen and the second set of counters will register a count of five. In the 20 microsecond interval discussed above, in which sixteen counting signals occur and the equivalent of eight signals between each pair of counting signals is achieved, an accuracy commensurate with a counting frequency of 16 x 8 or 128 counting signals is obtained.

The present embodiment incorporates the above in a novel arrangement for periodically converting direct voltage signals to a binary code of seven digit accuracy. A continuously running fixed frequency oscillator is used as the master timer for producing counting pulses for a four digit conventional binary counter. A starting pulse synchronized with a counting pulse of the master oscillator is provided from the master oscillator by a frequency divider. The starting pulse operates a gating arrangement which starts a sawtooth voltage generator and at the same time causes the start of counting of the counting signals by the four digit binary counters. The rising sawtooth voltage is compared to the direct voltage signal in a comparator circuit which, when the proper point of comparison is reached, triggers the gating arrangement so as to stop the count in the four digit binary counters. It also triggers a second gating arrangement which starts a second or vernier oscillator having a different frequency from the master timer. Pulses initiated by the vernier oscillator are counted in a second set of conventional binary counters. The second gating arrangement at the same instant causes both the master and vernier pulses to appear at a dual control grid tube. When a master pulse coincides with a vernier pulse, the dual control grid tube triggers the gating arrangement so as to stop further counting in the second set of counters. A count on both sets of counters becomes thereby a directly usable binary code number determined by the length of the interval to be measured. An arrangement is also provided for clearing the counting circuits in preparation for a new cycle.

The foregoing and other advantages, objects and features of the invention will be better understood from the following description taken in connection with the accompanying drawing wherein:

Fig. 1 is a schematic view of a preferred embodiment of the invention; and

Fig. 2 is a graph showing a typical master pulse, venier pulse and gating picture illustrating the operation of the embodiment in Fig. 1.

Referring to Fig. 1 in more detail, a master timer 10, such as a crystal oscillator, is, in this instance for purposes of illustration, made to oscillate at 800 kilocycles. The oscillator 10, together with pulse former 12, produces counting pulses, such as pulse 14, in line 16, at the rate of 800 kilocycles. The counting pulses 14 are made to appear through line 18 and capacitance 20 at a grid 22 of a dual control gating tube 24 in a gating circuit 26. The dual control gating tube 24 is normally maintained in a nonconductive condition by a negative bias on grid 28, as by connecting it through a suitable resistance 30 and negative terminal of a potential source 32. Thus, normally, the pulses 14 appearing at grid 22 will not be evident in line 34 leading from the anode of tube 24.

The oscillator 10, together with frequency divider 36 and pulse former 38, produces starting pulses 40 in line 42 at a rate to be hereinafter described and which is much smaller than the rate of the master counting pulses 14. The starting pulse 40 from line 42 appears through a condenser 46 at grid 48 of a triode 50 in a gate multivibrator 52. In the gate multivibrator circuit 52, triode 54 is normally in the conductive condition. The pulse 40 appearing at grid 48 causes the tube 50 to conduct and thereby extinguishes tube 54. This causes the potential at anode 56 of tube 54 to rise. The rise in potential at anode 56 appears through line 57 and condenser 58 at grid 28 as the rise 59 in Fig. 2. The rise in potential 59 is such that when pulse 14 appears at the other grid 22, the tube 24 will conduct, thereby causing a drop in potential at the anode of tube 24 which will appear as the negative pulse 60 in line 34. The pulse 60 in line 34 appears at a conventional counting circuit arrangement 61. One such suitable counting arrangement consists of bistable multivibrator circuits 62, 64, 66 and 68, connected together in conventional manner to count and register in binary code the pulses 60 and thereby pulses 14 in output lines 70, 72, 74 and 76. For example, by proper connection of the output lines 70, 72, 74 and 76 to the multivibrators 62, 64, 66 and 68, respectively, they may each be at the same reference potential when the count is zero. When the count is not zero, some lines will be at a different potential depending on the number in the counters. By representing those output lines which are at the reference potential by 0 and those output lines which are at the different potentials by a 1, sample counts in the multivibrator counters will appear in the output circuits as follows:

*Output line*

| 70 | 72 | 74 | 76 | Number |
|----|----|----|----|--------|
| 0  | 0  | 0  | 0  | 0      |
| 0  | 0  | 0  | 1  | 1      |
| 0  | 0  | 1  | 0  | 2      |
| 0  | 1  | 0  | 1  | 5      |
| 1  | 0  | 0  | 0  | 8      |
| 1  | 1  | 1  | 1  | 15     |

At the instant that pulse 40 caused tube 50 in the gate multivibrator 52 to conduct, the potential at anode 77 dropped. This drop in potential appears through line 79 at the sawtooth generator 78 and causes the generator to start generating a progressively increasing voltage 80 in line 82 leading from the sawtooth generator to a comparator circuit 84. At the comparator circuit 84 the rising sawtooth voltage is compared to a direct voltage signal 86 whose voltage is to be measured at suitable intervals and expressed as binary code numbers. One comparator circuit suitable for this purpose consists of a diode 88 whose anode 90 is connected to line 82 so as to receive the rising potential 80. The direct voltage signal 86 is made to appear through line 92 and suitable resistance 93 at cathode 94 of the diode 88. When the rising sawtooth voltage 80 becomes slightly greater than the voltage in the signal 86 and cathode 94, the diode 88 starts to conduct. This causes a rise in potential in cathode line 96, which, because of a blocking oscillator and amplifying circuit 98, will appear in line 100 as a triggering pulse 102. The triggering pulse 102 will appear through line 104 and condenser 106 at the grid 108 of tube 54 so as to cause tube 54 to conduct and extinguish tube 50. The potential at the anode 56 of tube 54 will thereby drop and cause a corresponding drop at the grid 28, shown at 110, Fig. 2. Thus pulses 14 will no longer cause conduction in tube 24 and the counters 61 will cease counting.

At the instant the pulse 102 caused the stopping of counting in the counters 61, it also appeared through line 100 at grid 112 of triode 114 in a vernier gate multivibrator 116 which may be similar to the gate multivibrator 52. In the gate multivibrator 116, triode 118 is normally conductive. When the pulse 102 appeared at grid 112, the triode 114 was caused to conduct, thereby extinguishing triode 118 and causing a rise in potential at anode 120 of triode 118. The rise in potential at anode 120 appears through line 122 and condenser 124 at grid 126 of a dual control grid tube 128 in a vernier gate circuit 130. The rise in potential at grid 126 and shown at 132 in Fig. 2 is such that the tube 128 is in proper condition for conducting current when pulses 134 appear through line 136 and condenser 138 at grid 140 of the tube 128. When triode 114 started to conduct, the potential at anode 142 dropped, thereby causing a similar drop in potential in line 144. The drop in potential in line 144 causes the oscillator 148 to oscillate and together with pulse former 150 to produce pulses 134. The oscillator 148 may be a suitable high Q tank circuit which, for purposes of illustration in this instance, is made to oscillate at a frequency of 914 kilocycles. The pulses 134 appearing at grid 140 will cause negative pulses 152 to appear in line 154 in a manner similar to the negative pulses 60 appearing in line 34. The pulses 152 appearing in line 154 are counted in a second set of counting circuits 156, such as bistable multivibrators 158, 160 and 162, which may be similar to the counting circuits 61 and similarly connected. Output lines 164, 166 and 168 of the multivibrators 158, 160 and 162, respectively, may have number designating potentials, as explained, with regard to output lines of counting circuits 61. Thus the count on counting circuits 156 will appear as follows:

*Output lines*

| 164 | 166 | 168 | Number |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

The negative pulses 152 also appear through line 170 at the amplifier 172 where they are inverted and appear as positive pulses 174 at grid 176 of a dual control grid tube 178 in a coincident circuit 180. Positive pulses 14 from the oscillator 10 are also made to appear at the coincident circuit 180 by means of line 16 connected through capacitor 182 to grid 184 of the dual control grid tube 178. Dual control grid tube 178 is normally nonconductive. It becomes conductive only when pulses 174 and 14 occur simultaneously at grids 184 and 176, respectively. The simultaneous appearance of positive pulses 174 and 14 at grids 176 and 184 will cause flow through the tube 178, thereby causing a drop in potential at its anode which will appear as a negative terminating pulse 186 in line 188. The terminating pulse 186 appears through line 190 at an amplifier 192 where it is inverted to a positive pulse 194. Positive pulse 194 appears through line 196 at grid 198 and causes triode 118 to conduct, thereby extinguishing triode 114. When triode 118 begins to conduct, the potential at its anode 120 drops, thereby causing a drop in potential in line 122 which causes a corresponding drop at grid 126 of the dual control grid tube 128. This drop in potential at grid 126 is shown at 200, Fig. 2, and prevents further pulses 152 from appearing in lines 154 and 170. The counters 156 will thereby register a count proportional to the time interval between the last of pulses 14 appearing at counters 61, and shown as 14' in Fig. 2, and the counting termination point shown at 110, Fig. 2. Thus in the instance shown in Fig. 2, it will be noted that five pulses 134 appear framed in the gate between 132 and 200. Since the ratio between the vernier pulse rate and the master pulse rate is chosen 8/7 in this instance, the termination point 110 is found directly by the count on counters 156 to have occurred five-eighths of the distance between the pulse 14' and 14'', Fig. 2. Thus the interval measured in the present instance shown in Fig. 2 occurring between 59 and 110 may be read directly as a binary coded number from both counters 61 and 156, and will appear as

| output line | 70 | 72 | 74 | 76 | 164 | 166 | 168 |
|---|---|---|---|---|---|---|---|
| code representation | 0 | 1 | 0 | 1 | 1 | 0 | 1 | and represents the number 45.

The negative termination pulse 186 will also appear through line 202 to trigger the delay multivibrator 204. The multivibrator 204 may be a monostable multivibrator set with a time delay sufficiently long to permit recording or other use of the count registered on counters 61 and 156 before causing clearing circuit 206 to pulse all of the multivibrators in counting circuits 61 and 156 so as to reset them to zero in preparation for a new cycle similar to that explained above.

In the present embodiment, where an 800 kilocycle oscillator 10 is used as the master timer and a 914 kilocycle oscillator is used as the vernier timer, the maximum interval which may be measured by the counter 61 is 20 microseconds in length with an additional 1.25 microseconds for the maximum possible vernier measurement. Therefore, the frequency of the divider 36 for starting new cycles should be sufficiently small to permit ample time for both measuring the longest possible time interval which may occur and also the time interval required by the delay multivibrator 204 for utilization of the measurement registered in the counting circuits 61 and 156. One frequency found suitable for the frequency divider 36 is 1333 cycles per second, but other frequencies may be used equally well.

In the present embodiment where a 20 microsecond maximum time interval is used, the sawtooth voltage generator 78 is made to produce a rising voltage 80 sufficiently rapid to cover the maximum possible voltage of the direct voltage signal 86 in 20 microseconds.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A system comprising a first means for generating signal pulses at one rate, a second means for generating signal pulses at a rate different from the rate of said first means, means responsive to coincident signal pulses for producing an output signal, means responsive to an input signal for causing pulses of said first and second means to appear at said responsive means thereby causing an output signal at an interval from said input signal determined by the position of said input signal with respect to the pulse of said first means immediately preceding said input signal.

2. A system comprising a first means for generating signal pulses at one rate, a second means for generating signal pulses at a rate different from the rate of said first means, means responsive to two time-separated intelligence pulses for counting the pulses generated by said first means during the interval between said two intelligence pulses, and means for determining the interval between the last of said counted pulses and the later in time pulse of said two intelligence pulses.

3. A system comprising a first means for generating signal pulses at a fixed rate, means responsive to two time-separated intelligence pulses for counting the pulses generated by said first means during the interval between said two intelligence pulses, means for determining the interval between the last of said counted pulses and the later in time pulse of said two intelligence pulses, said last-mentioned means including a second means for generating signal pulses at a rate different from the rate of said first means, means responsive to coincident signal pulses for producing an output signal, means for causing pulses of said first and second means to appear at said responsive means, and means responsive to said later in time pulse of said two intelligence pulses and said output signal for counting the pulses of one of said first and second generating means during said later in time pulse of said two intelligence pulses and said output signal pulse.

4. A system for determining the position of a signal between two pulses of continuously generated fixed frequency pulses comprising means for generating pulses at a rate different from the rate of the first-mentioned pulses, means responsive to coincident pulses for producing an output signal, means responsive to said first-mentioned signal for causing said first-mentioned pulses and said second-mentioned pulses to appear at said responsive means, and thereby causing an output signal at an interval from said first-mentioned signal determined by the position of said first-mentioned signal between said two pulses.

5. A system for determining the position of a signal between two pulses of continuously generated fixed frequency pulses comprising means for generating pulses at a rate greater than the rate of said first-mentioned pulses, means responsive to coincident pulses for producing an output signal, means responsive to said first-mentioned signal for causing said first-mentioned pulses and said second-mentioned pulses to appear at said responsive means, and thereby causing an output signal at an interval from said first-mentioned signal proportional to the interval between said first-mentioned signal and the first occurring pulse of said two pulses.

6. A system for determining the position of a signal between two pulses of continuously generated fixed frequency pulses comprising means for generating pulses at a rate different from the rate of said first-mentioned pulses, means responsive to coincident pulses for producing an output signal, means responsive to said first-mentioned signal for causing said first-mentioned pulses and said second-mentioned pulses to appear at said responsive means, and means responsive to said first-mentioned signal and said output signal for counting the pulses occurring at one of said rates during the interval between said first-mentioned signal and said output signal.

7. A system for determining the position of a signal between two pulses of continuously generated fixed frequency pulses comprising means for generating pulses at a rate different from the rate of said first-mentioned pulses, means responsive to coincident pulses for producing an output signal, means responsive to said first-mentioned signal for causing said first-mentioned pulses and said second-mentioned pulses to appear at said responsive means, means responsive to said first-mentioned signal and said output signal for counting the pulses occurring at one of said rates during the interval between said first-mentioned signal and said output signal, and delay means responsive to said output signal for resetting said counting means to zero.

8. A system comprising a first means for generating signal pulses at a fixed rate, a second means for generating signal pulses at a rate different from the rate of said first means, means for producing a continuously rising potential, a first means for counting the pulses from one of said pulse generators, means for starting said counting means and said rising potential means in a known time relation, a second means for counting the pulses from one of said pulse generators, means responsive to coincident signal pulses for stopping further counting in said second counting means, means responsive to a comparison of said rising potential and an outside voltage signal for stopping said first counting means, starting a count in said second counting means, and causing said pulses of said first and second generating means to appear at said coincident responsive means thereby stopping said second counting means when a pulse from said first generating means coincides with a pulse from said second generating means.

9. A system comprising a first means for generating signal pulses at one rate, a second means for generating signal pulses at a rate different from the rate of said first means, said difference being such that a difference of one pulse exists in a selected time interval, means responsive to coincident signal pulses for producing an output signal, means responsive to an input signal for causing pulses of said first and second means to appear at said responsive means thereby causing an output signal at an interval from said input signal determined by the position of said input signal with respect to the pulse of said first means immediately preceding said input signal.

JACK MOFENSON.

REFERENCES CITED

The following references are of record in the file of this patent:

UNITED STATES PATENTS

| Number | Name | Date |
| --- | --- | --- |
| 2,414,107 | Kenyon | Jan. 14, 1947 |
| 2,490,500 | Young | Dec. 6, 1949 |

Disclaimer 2,560,124.—*Jack Mofenson*, Medford, Mass. INTERVAL MEASURING SYSTEM. Patent dated July 10, 1951. Disclaimer filed Nov. 13, 1953, by the assignee, *Raytheon Manufacturing Company*.
Hereby enters this disclaimer to claims 1, 4, 5, 6, and 9 of said patent.
[*Official Gazette December 15, 1953.*]